(12) United States Patent
Nakamura et al.

(10) Patent No.: US 8,693,832 B2
(45) Date of Patent: Apr. 8, 2014

(54) OPTICAL FIBER

(75) Inventors: Masanobu Nakamura, Tokyo (JP);
Yoshihiro Arashitani, Tokyo (JP)

(73) Assignee: Furukawa Electric Co., Ltd., Tokyo (JP)

( * ) Notice: Subject to any disclaimer, the term of this patent is extended or adjusted under 35 U.S.C. 154(b) by 243 days.

(21) Appl. No.: 13/155,650

(22) Filed: Jun. 8, 2011

(65) Prior Publication Data
US 2012/0008907 A1 Jan. 12, 2012

(30) Foreign Application Priority Data

Jul. 7, 2010 (JP) ................................. 2010-154832

(51) Int. Cl.
*G02B 6/02* (2006.01)
(52) U.S. Cl.
USPC .......................................... 385/123; 385/144
(58) Field of Classification Search
None
See application file for complete search history.

(56) References Cited

U.S. PATENT DOCUMENTS 5,822,489 A 10/1998 Hale
6,959,022 B2 10/2005 Sandrock et al.

FOREIGN PATENT DOCUMENTS

JP 10-197731 7/1998
JP 2006-519495 8/2006

OTHER PUBLICATIONS

U.S Appl. No. 13/754,985, filed Jan. 31, 2013, Tanaka, et al.

*Primary Examiner* — Jerry Rahll
(74) *Attorney, Agent, or Firm* — Oblon, Spivak, McClelland, Maier & Neustadt, L.L.P.

(57) ABSTRACT

The present invention provides an optical fiber which can have a larger NA and a preferable mechanical strength even with a monolayer coating and can be fabricated at low cost, and which can transmit excitation light efficiently reducing a loss even under a high temperature environment during the operation of a fiber laser. An optical fiber according to an embodiment of the present invention includes a core, a glass cladding which is provided at a periphery of the core and has a refractive index smaller than the core, and a polymer cladding which is provided at a periphery of the glass cladding and has a refractive index smaller than the glass cladding. The polymer cladding contains fluorine and the polymer cladding has a difference between an elasticity modulus at 60° C. and that at 23° C. equal to or smaller than 100 MPa and also has an elasticity modulus equal to or larger than 200 MPa at 23° C.

14 Claims, 1 Drawing Sheet

OPTICAL FIBER

BACKGROUND OF THE INVENTION

1. Field of the Invention

The present invention relates to an optical fiber, and, in more detail, relates to a polymer-cladding optical fiber to be used for a double-cladding fiber having two cladding layers.

2. Description of the Related Art

Conventionally, in a double-cladding fiber transmitting excitation light in a cladding layer for exciting signal light to be transmitted in a core, small refractive index resin coatings the outside of a glass cladding as a second cladding layer. As the small refractive index resin, fluorine-based UV-curable resin is used for making a refractive index smaller than that of a first cladding layer for transmitting the excitation light.

Meanwhile, in Published Japanese Translation of PCT International Application Publication No. 2006-519495, a multi-cladding structure by using silica glass for the second cladding layer and doping fluorine into this silica glass to make a refraction index smaller than that of the first cladding layer is obtained. Further, at the periphery of the second cladding layer, a protection layer made of polymer is formed for protecting the second cladding layer of the silica glass from the outside.

In the configuration of the double-cladding fiber disclosed in Published Japanese Translation of PCT International Application Publication No. 2006-519495, the first cladding layer functions as a core for the excitation light propagation and the second cladding layer, which is made of fluorine-doped silica glass, functions as a cladding for the excitation light propagation. In Published Japanese Translation of PCT International Application Publication No. 2006-519495, the existence of the second cladding layer made of glass reduces a leak of an evanescent field from the excitation light propagating in the first cladding layer into the polymer protection layer and suppresses damage of the polymer protection layer by the evanescent field. Further, the second cladding layer doped with fluorine increases the heat resistant strength of the double-cladding fiber (multi-cladding fiber).

However, the NA of the multi-cladding fiber such as the double-cladding layer is proportional to a refractive index difference of the first cladding layer made of silica-glass and the second cladding layer made of silica-glass. Since there is a limit in a fluorine amount which can be doped into the silica glass, it is difficult in Published Japanese Translation of PCT International Application Publication No. 2006-519495 to greatly reduce the refractive index of the second cladding layer by the fluorine doping.

On the other hand, the fluorine content amount can be increased in a resin such as a UV-curable fluorine-based resin more than in the silica glass. Accordingly, a polymer cladding as the second cladding layer provides a higher possibility of increasing the NA of the fiber. For an application requiring an increase in an output light intensity such as a fiber laser, it is required to transmit more excitation light within the first cladding and thus the polymer cladding, which can be expected to provide a larger NA, is used for the second cladding layer (refer to Japanese Patent Application Laid-Open Publication No. H10-197731).

However, there is a problem that the fluorine-based resin has a weak mechanical strength compared to non-fluorine-based UV-curable resin. Accordingly, when using the fluorine-based resin for the second cladding layer (first coating layer) of the double-cladding fiber as in the technique disclosed in Japanese Patent Application Laid-Open Publication No. H10-197731, it is necessary to coat the second cladding layer with a second coating layer which is superior in the mechanical strength, which results in a higher cost.

Further, when an incident light intensity changes as in the fiber laser which uses a double-cladding fiber disclosed in Japanese Patent Application Laid-Open Publication No. H10-197731, self heating of the fiber is enhanced and the mechanical strength of the polymer cladding material is reduced. In particular, when the fiber laser has a high output, that is, when the temperature is increased, the mechanical strength is reduced in the second cladding layer (first coating layer) which is made of the fluorine-based resin. Accordingly, the protection function for the first cladding layer including silica glass as a main component and the protection function for the core are lost, which results in a failure of the fiber laser.

Moreover, in Published Japanese Translation of PCT International Application Publication No. 2006-519495, it is inevitably necessary to configure the second cladding layer using silica glass for a technical purpose of protecting the resin protection layer from the evanescent field leaked from the first cladding layer. As described above, since the amount of the fluorine doped into the silica glass is limited to a small value, the reduction of the refractive index by the fluorine doping cannot be expected in a large extent and it is difficult to increase the NA.

SUMMARY OF THE INVENTION

The present invention has been achieved in view of such a problem and aims at providing an optical fiber which can have a larger numerical aperture (NA) and a preferable mechanical strength even with a monolayer coating and can be fabricated at low cost, and also which can transmit the excitation light efficiently while reducing a loss even under a high temperature environment of fiber laser operation.

For achieving such an object, the present invention provides an optical fiber, comprising: a core; a glass cladding which is provided at a periphery of the core and has a refractive index smaller than the core; and a polymer cladding which is provided at a periphery of the glass cladding and has a refractive index smaller than the glass cladding, wherein the polymer cladding contains fluorine, and the polymer cladding has a difference between an elasticity modulus at 60° C. and that at 23° C. equal to or smaller than 100 MPa, and also the polymer cladding has a Young' modulus equal to or larger than 200 MPa at 23° C.

Further, the present invention provides an optical fiber, comprising: a core; a glass cladding which is provided at a periphery of the core and has a refractive index smaller than the core; and a polymer cladding which is provided at a periphery of the glass cladding and has a refractive index smaller than the glass cladding, wherein the polymer cladding includes perfluoropolyether having two (meth)acrylate functional groups.

The present invention can realize the cladding (e.g., second cladding layer) function for the excitation light and the glass protection function using a single layer while increasing the NA, by increasing the elasticity modulus of the fluorine-doped polymer cladding material having a low refractive index, within an operating temperature range. Accordingly, the cladding layer for the excitation light and the protection layer need not be provided separately from each other and cost reduction can be realized.

DETAILED DESCRIPTION OF THE INVENTION

Figure 1:
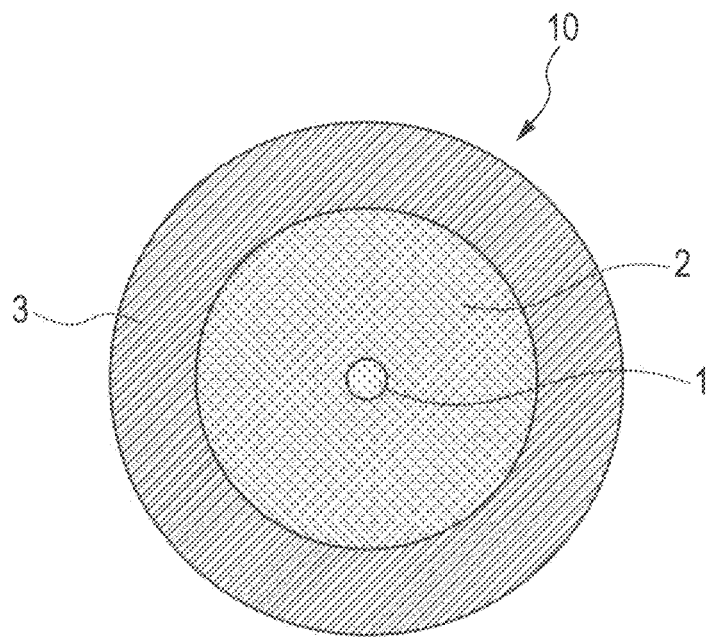
FIG. 1 is a cross-sectional view of an optical fiber according to an embodiment of the present invention.

Hereinafter, details of an embodiment of the present invention will be explained with reference to the drawings. Note that, in the drawings to be explained hereinafter, an element having the same function is denoted by the same reference numeral and repeated explanation thereof will be omitted.

In FIG. 1, an optical fiber 10 applicable to a double-cladding fiber laser is provided with a core 1 at the center thereof, and, at the periphery of the core 1, a glass cladding 2 is provided as a first cladding layer having a refractive index smaller than that of the core 1. Further, at the periphery of the glass cladding 2, a polymer cladding 3 is provided as a second cladding layer having a refraction index smaller than the glass cladding 2.

In such a configuration, the glass cladding 2 as the first cladding layer functions as a cladding for the core 1, and functions as a core for the polymer cladding 3 as the second cladding layer. That is, the glass cladding 2 functions as a cladding for laser light which is oscillated in the core 1 by excitation light incident to the optical fiber 10 and functions as a core for the incident excitation light.

Moreover, the polymer cladding 3 has a mechanical strength which is sufficiently large under environments of a room temperature and also a high temperature, and further functions as a cladding for the excitation light as well as a protection layer of the glass cladding 2, since the polymer cladding 3 has a refractive index smaller than the glass cladding 2. That is, the polymer cladding 3 plays two roles; a role as a cladding layer for the excitation light and a role of protecting the glass cladding 2. Accordingly, even when the fluorine-based resin is used for the second cladding layer, it is not necessary to provide a protection layer separately and it is possible to increase the amount of fluorine doped into the second cladding layer for increasing the NA while reducing the labor hour of providing the protection layer separately and reducing cost.

For each of the core 1 and the glass cladding 2, it is possible to use a material used for a typical fiber laser. For example, quartz having an additive such as erbium or ytterbium may be used for the core 1 and quartz may be used for the glass cladding 2.

While, for the polymer cladding 3, it is possible to use fluorine-based resin (resin containing fluorine) such as urethane acrylate containing fluorine as a main component thereof, the polymer cladding 3 is designed on the basis of a new technical finding and a new technical concept as shown below which was not known in the past. Note that, in the present invention, any material may be used for a main component of the polymer cladding 3, if it is fluorine-based resin conventionally used for a fiber laser.

Meanwhile, it is possible to reduce the refractive index of the second cladding layer (polymer cladding) 3 by using the fluorine-based resin for the polymer cladding 3 as the second cladding layer compared to the case of using glass for the second cladding layer, and thereby the NA can be increased and more excitation light can be coupled to the optical fiber 10. However, when the optical fiber is disposed under a high temperature environment while the double-cladding fiber laser is operated, the mechanical strength is reduced in the second cladding layer made of the fluorine-based resin. In particular, when a laser output is increased, self heating occurs in the fiber resulting in the reduction of the mechanical strength. Accordingly, conventionally it has been necessary to provide a protection layer having a superior heat resistance separately from the second cladding layer as in Japanese Patent Application Laid-Open Publication No. H10-197731, for securing a sufficiently large mechanical strength also under the high temperature environment.

Meanwhile, the present invention has obtained a technical finding that the transmission loss of the excitation light introduced into the double-cladding fiber laser is reduced with the increase of the elasticity modulus of the second cladding layer which functions as a cladding for the excitation light. The technical finding has been obtained for the first time in the present invention. That is, according to the technical finding obtained in the present invention, it is possible to reduce the transmission loss and transmit the excitation light efficiently by increasing the elasticity modulus of the polymer cladding 3 as much as possible during the operation.

Here, considering not providing the protection layer separately, it is necessary to secure a sufficiently large mechanical strength under environments of not only a room temperature but also a high temperature. Meanwhile, according to the technical finding obtained for first time as described above, it is possible to reduce the transmission loss of the excitation light as the elasticity modulus of the polymer cladding 3 is increased. That is, by causing the mechanical strength of the polymer cladding 3 to become larger than a predetermined value also under the high temperature environment, it is possible to obtain a sufficiently large mechanical strength without providing the protection layer separately and also to reduce the transmission loss of the excitation light.

In the present invention, for the double-cladding fiber laser which uses the fluorine-based resin as the second cladding layer, the polymer cladding 3 is designed according to the new technical concept, which did not exist in the past, that the elasticity modulus of the polymer cladding made of the fluorine-based resin is to be set appropriately for the purpose of obtaining an efficient mechanical strength without the protection layer provided separately from the second cladding layer (cladding layer for the excitation light) while reducing the transmission loss of the excitation light.

In an embodiment of the present invention, according to such a technical concept, the polymer cladding 3 is designed so as to cause the elasticity modulus to be larger than a predetermined value at a predetermined temperature (e.g., room temperature) under which the optical fiber 10 is normally disposed, and also to cause a difference between the elasticity moduli at the predetermined temperature and a high temperature during the operation of the double-cladding fiber laser to be reduced as much as possible, that is to become smaller than a predetermined value, and this is a novel idea of the present invention.

As a result of a concentrated study according to such a novel idea, the present invention has found that it is possible to obtain a preferable mechanical strength without providing a protection layer separately and to reduce the transmission loss and transmit the excitation light efficiently, by fabricating the polymer cladding 3 so as to cause the elasticity modulus variation of the cladding 3 in a predetermined temperature range (23° C. (room temperature) to 60° C. (high temperature environment)) to become equal to or smaller than 100 MPa (difference between an elasticity modulus at 60° C. and that at 23° C. in the polymer cladding 3 is equal to or smaller than 100 MPa) and also so as to cause the elasticity modulus of the polymer cladding 3 to become equal to or larger than 200 MPa at a predetermined temperature (23° C.), as shown in an example to be described below. Further, since the polymer cladding is used as the second cladding layer, it is possible to increase the content amount of the fluorine and to increase the NA.

In another embodiment of the present invention, the polymer cladding 3 is caused to contain perfluoropolyether having two (meth)acrylate functional groups. Since the perfluoropolyether having two (meth)acrylate functional groups forms the polymer cladding 3 in this manner, each of the monomers forms a polymer having a mesh structure through radical polymerization. Accordingly, it is possible to improve the mechanical strength of the polymer cladding 3 while reducing the refractive index. Further, by using the perfluoropolyether, it is possible to increase a crosslink density and to obtain the polymer cladding 3 having a larger mechanical strength.

That is, since it is possible to increase the crosslink density by causing the polymer cladding 3 to contain the perfluoropolyether having two (meth)acrylate functional groups, the polymer cladding 3 having a denser mesh structure can be formed and the mechanical strength of the polymer cladding 3 can be increased even under the high temperature environment. Accordingly, without providing the protection layer separately, it is possible to cause the polymer cladding 3, which is a cladding for the excitation light, to perform the function of the protection layer, and further to reduce the transmission loss of the excitation light.

Note that it is preferable to determine the molecular weight of the perfluoropolyether having two (meth) acrylate functional groups to be smaller than 1,500, and it is more preferable to determine the molecular weight to be equal to or larger than 600 and smaller than 1,500. In the present invention, considering the realization of the new technical concept, it is necessary to make the elasticity modulus of the polymer cladding 3 as large as possible and it is preferable to increase the crosslink density of the polymer cladding 3 for this purpose. However, the crosslink density becomes smaller comparatively as the molecular weight of the perfluoropolyether having two (meth)acrylate functional groups becomes larger. Accordingly, when the molecular weight is large enough to exceed a predetermined value, it become not possible to obtain a crosslink density corresponding to the mechanical strength of the polymer cladding 3 in an acceptable range which is determined from a viewpoint of the transmission loss and the protection. From this viewpoint, it is preferable to determine the molecular weight of the perfluoropolyether having two (meth) acrylate functional groups to be smaller than 1,500. That is, it is possible to cause the crosslink density to be in an appropriate range by determining the molecular weight of perfluoropolyether having two (meth)acrylate functional groups to be smaller than 1,500, and it is possible to realize both of the cladding function for the excitation light and the protection function for the glass cladding 2 using the polymer cladding 3 while reducing the transmission loss also under the high temperature environment.

Further, considering reducing the refractive index of the polymer cladding 3 to increase the NA, it is preferable to use the perfluoropolyether having two (meth)acrylate functional groups in which a fluorine content rate is equal to or higher than 50 wt %.

EXAMPLE

Hereinafter, an example of the present invention will be explained.

In the present example, radiation curable resins were fabricated including, as a main component, urethane acrylate in which urethanes are combined with each other by fluorinated polyether, and including reactive diluent which is a fluorinated acrylate monomer or non-fluorinated acrylate monomer, and a photopolimerization initiator, as composition materials of the polymer cladding 3 in the optical fiber 10 to be applied to the double-cladding fiber. Each the composition ratio of a fabricated sample is shown below in Table 1.

Monomer A is a monofunctional fluorinated acrylate monomer. Monomer B is a bifunctional fluorinated acrylate monomer having a molecular weight of approximately 400 to 600. Monomer C is a bifunctional fluorinated acrylate monomer having a molecular weight of approximately 1,500 and a fluorine content rate of 52 wt %. Monomer D is a bifunctional fluorinated acrylate monomer having a molecular weight of approximately 600 and a fluorine content rate of 51 wt %. Monomer E is a fluorinated acrylate monomer having a molecular weight of approximately 2,500 and a fluorine content rate of 54 wt %. Further, each of Monomers C, D and E has a structure in which an acryloyl group is added to an end of a perfluoropolyether chain and a structure having two acryloyl groups.

Note that, in the present example, it is important to use the perfluoropolyether having two functional groups for radical polymerization in order to further improve the crosslink density, and, for Monomers C, D and E, obviously perfluoropolyether having two methacrylate functional groups may be used, not limited to perfluoropolyether having two acrylate functional groups.

Samples A to I (present example) and Samples J to L (comparative examples) were fabricated as shown in Table 1 for the polymer cladding 3 by means of appropriately compounding the urethane acrylate and Monomers A to E. In the compounding, the materials were put into a glass container precisely at a ratio described in Table 1, and stirred for approximately five minutes, and then it was visually checked whether each of the materials was mixed or not. When the viscosity is high and an air bubble enters in a large amount during the stirring, the stirring may be performed in a state heated to 50° C. on a hot plate. A basic characteristic of each fabricated sample was evaluated. Details of the test method are as follows.

(1) The viscosity of the sample compounded in a composition ratio shown in Table 1 was measured with a Brookfield viscometer at a rotation speed of 20 rpm. The measurement was performed under a temperature environment of 23° C.

(2) The sample compounded in a composition ratio shown in Table 1 was spin-coated on a glass substrate in 100 μm.

(3) The glass substrate, on which the sample had been coated, was put into a purge box having a quartz plate cover, purged with nitrogen gas for 5 minutes at 15 l/min, and irradiated with UV light by the use of D-Bulb of Fusion UV Systems. The irradiation was performed at an irradiance level of 3,500 mJ/cm$^2$.

(4) For measurement of the elasticity modulus of the polymer cladding 3, an optical fiber 10 was cut into a short piece having a width of 6 mm and the elasticity modulus was measured. The elasticity modulus was measured under a tension stress by the use of RSA3 of TA Instruments and calculated at an applied stress of 2.5% distortions. The measurement was performed under temperature environments of 23° C. and 60° C.

(5) The refractive index was measured by the use of Prism Coupler 2010M of Metricon Corporation. The measurement was performed at a wavelength of 594 nm and under a temperature environment of 23° C.

TABLE 1

| | | | EXAMPLE | | | | | | | | | COMPARATIVE EXAMPLE | | |
|---|---|---|---|---|---|---|---|---|---|---|---|---|---|---|
| | | | SAMPLE A | SAMPLE B | SAMPLE C | SAMPLE D | SAMPLE E | SAMPLE F | SAMPLE G | SAMPLE H | SAMPLE I | SAMPLE J | SAMPLE K | SAMPLE L |
| COMPOSITION RATIO | URETHANE ACRYLATE | (Wt %) | 69 | 69 | 60 | 65 | 70 | 75 | 85 | 64 | 70 | 94 | 84 | 60 |
| | MONOMER A | (Wt %) | | | 10 | 10 | 10 | 10 | | | 10 | | 10 | 10 |
| | MONOMER B | (Wt %) | | | 9 | 9 | 9 | 9 | 10 | | 19 | | 5 | |
| | MONOMER C | (Wt %) | 30 | | 20 | 15 | 10 | 5 | | | | | | |
| | MONOMER D | (Wt %) | | 30 | | | | | 5 | 35 | | | | |
| | MONOMER E | (Wt %) | | | | | | | | | | 5 | | 29 |
| | PHOTOPOLYMERIZATION INITIATOR | (Wt %) | 1 | 1 | 1 | 1 | 1 | 1 | 1 | 1 | 1 | 1 | 1 | 1 |
| | VISCOSITY | (mPa·s 23° C.) | 2020 | 1050 | 1260 | 1870 | 2890 | 7650 | 49980 | 870 | 5500 | 88790 | 50800 | 2040 |
| RESIN CHARACTERISTIC | YOUNG'S MODULUS | (MPa) 23° C. | 220 | 279 | 261 | 240 | 229 | 218 | 208 | 288 | 256 | 84 | 152 | 148 |
| | | (MPa 60° C.) | 138 | 195 | 179 | 168 | 137 | 128 | 111 | 212 | 172 | 11 | 28 | 22 |
| | REFRACTIVE INDEX | (23° C.) | 1.388 | 1.390 | 1.388 | 1.387 | 1.386 | 1.385 | 1.385 | 1.390 | 1.393 | 1.380 | 1.381 | 1.382 |

Above Table 1 shows a composition ratio and resin characteristics (viscosity at 23° C., elasticity moduli at 23° C. and 60° C., and refractive index at 23° C.) in each of Samples A to L.

(Measurement of an Increased Amount in a Transmission Loss)

A 125 μm multi-mode optical fiber (optical fiber 10) was fabricated by way of coating a glass cladding 2 using each of Samples A to L shown in Table 1 as the polymer cladding 3. The polymer cladding 3 of the coating layer was fabricated to have a thickness of 60 μm and the outer diameter of the fiber including the coating layer was 245 to 255 μm.

A transmission loss amount (excitation light loss) was measured by the use of the fabricated fiber. The transmission loss amount here is an excitation light loss in Table 2. Further, the glass was pulled out from the optical fiber 10 which was the fabricated multimode fiber and the elasticity modulus of the polymer cladding 3 was measured at 23° C. and 60° C. The transmission loss and the elasticity modulus are shown in Table 2.

Figure 2:
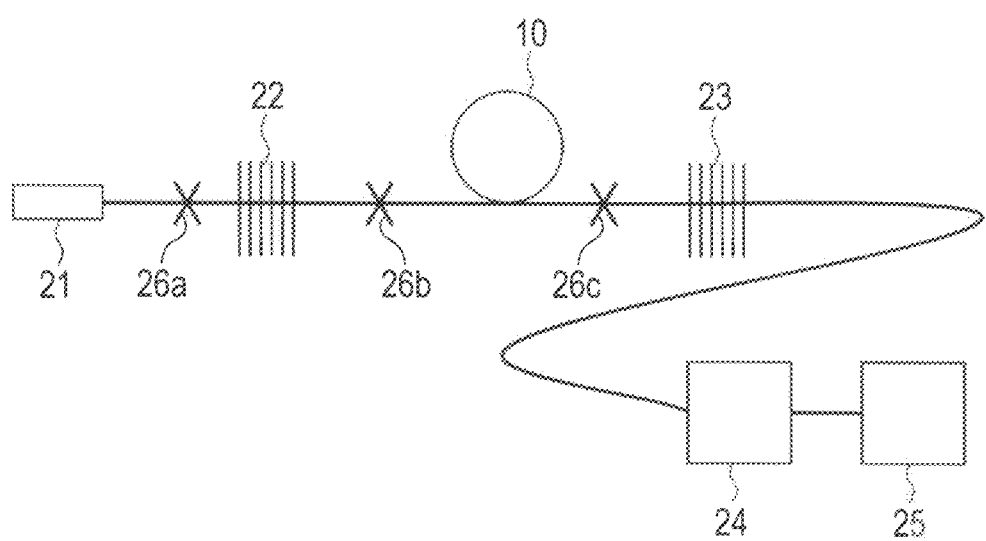
FIG. 2 is a diagram showing a measurement system of an increased amount in a transmission loss according to an embodiment of the present invention.

The transmission loss was measured by the cut-back method. A measurement system according to the present example is shown in FIG. 2. Reference numeral 21 indicates a laser diode; reference numeral 22, a high-reflectivity mirror; reference numeral 23, an output coupler; reference numeral 24, a measurement head; reference numeral 25, a power meter; and reference numerals 26a to 26c, fusion points between the optical fibers. In the present example, the reflectance of the high-reflectivity mirror 22 is 100% and the reflectance of the output coupler 23 is 20%, for example, and the optical fiber 10, which is provided between the high-reflectivity mirror 22 and the output coupler 23, oscillates laser with excitation light input from the laser diode 21. The oscillated laser is output from the output coupler 23 to the measurement head 24, and the transmission loss of the optical fiber 10 is measured by the power meter 25. In the present example, the measurement was performed at a wavelength of 975 nm. The length of the optical fiber 10 was 10 m for the measurement. In Table 2, a case of the measured transmission loss equal to or smaller than 5.0 dB/km is denoted by symbol Δ, a case of equal to or smaller than 1.0 dB is denoted by symbol ○, and a case of larger than 5.0 dB/km is denoted by symbol xX.

TABLE 2

| | POLYMER-CLAD LAYER | YOUNG'S MODULUS 23° C. (MPa) | YOUNG'S MODULUS 60° C. (MPa) | EXCITATION LIGHT LOSS |
|---|---|---|---|---|
| EXAMPLE | SAMPLE A | 211 | 126 | ○ |
| | SAMPLE B | 261 | 183 | ○ |
| | SAMPLE C | 249 | 153 | ○ |
| | SAMPLE D | 223 | 147 | ○ |
| | SAMPLE E | 217 | 128 | ○ |
| | SAMPLE F | 209 | 119 | ○ |
| | SAMPLE G | 201 | 107 | ○ |
| | SAMPLE H | 281 | 197 | ○ |
| | SAMPLE I | 245 | 159 | Δ |
| COMPARATIVE EXAMPLE | SAMPLE J | COVERING WAS NOT POSSIBLE | | |
| | SAMPLE K | COVERING WAS NOT POSSIBLE | | |
| | SAMPLE L | 141 | 17 | x |

As shown in Table 2, the transmission loss in Sample H of the present example was larger than those of other Samples A to G and I. This would be because the viscosity of the polymer cladding material in an uncured state is too low as shown in Table 1 and the thickness of the fiber is biased after wire drawing. However, the transmission loss can be suppressed to be equal to or smaller than 5.0 dB/km even in Sample H, and also the elasticity modulus of the polymer cladding 3 can be made equal to or larger than 200 MPa at 23° C. and further the elasticity modulus variation can be made equal to or smaller than 100 MPa in a temperature range between 23° C. and 60° C. Accordingly, also in Sample H, a sufficiently large mechanical strength can be obtained under both of the room temperature and high temperature environments without the addition of the protection layer and also the transmission loss can be reduced.

Further, when the input light intensity is 10 W from the laser diode 21 to the optical fiber 10, the transmission loss is equal to or smaller than 1.0 dB in each of Samples A to G and Sample I in the present example as shown in Table 2, and that of Sample H is equal to or smaller than 5.0 dB. Also as shown in Table 1, the elasticity modulus of the polymer cladding 3 can be made equal to or larger than 200 MPa at 23° C. and further a difference between an elasticity modulus at 60° C. and that at 23° C. can be made equal to or smaller than 100 MPa, in each of Samples A to I in the present example. Accordingly, it is possible to obtain a sufficiently large mechanical strength under both of the room temperature and high temperature environments without providing the protection layer while greatly reducing the transmission loss of the excitation light.

Meanwhile, in the fiber laser case, it is required sometimes to transmit more excitation light in the glass cladding 2 of the first cladding layer for increasing the output. In this case, the output can be increased as the refractive index of the polymer cladding 3 is reduced as much as possible to make the NA of the fiber higher. For this purpose, Samples E, F and G are the best modes among nine samples shown in the present example.

Further, in the case of using the perfluoropolyether having two acrylate functional groups, it is preferable to make the content rate of the perfluoropolyether having two acrylate functional groups 5 to 30 wt %, considering the viscosity, elasticity modulus, refractive index, and transmission loss as shown in Tables 1 and 2.

On the other hand, for samples J and K of Comparative example, viscosity in an uncured state was high and the wire drawing could not be performed. In sample L of Comparative example, the elasticity modulus of the polymer cladding 3 is low and thereby the transmission loss is considered to be large. This is supposedly because the input light had a large intensity and the temperature of the fiber was increased by the self heating, and thereby the elasticity modulus of the cladding layer was reduced.

In the present example, it is possible to form the polymer cladding 3 at the periphery of the glass cladding 2 as the coating layer by setting the viscosity of the polymer cladding material of the polymer cladding 3 to be 1,000 to 50,000 mPa·s in an uncured state.

What is claimed is:
1. An optical fiber, comprising:
   a core;
   a glass cladding which is provided at a periphery of the core and has a refractive index smaller than the core; and
   a polymer cladding which is provided at a periphery of the glass cladding and has a refractive index smaller than the glass cladding, wherein
   the polymer cladding contains fluorine, and
   the polymer cladding has a difference between an elasticity modulus at 60° C. and that at 23° C. equal to or smaller than 100 MPa, and also the polymer cladding has a Young' modulus equal to or larger than 200 MPa at 23° C.

2. The optical fiber according to claim 1, wherein
   the polymer cladding contains perfluoropolyether having two (meth)acrylate functional groups with a molecular weight less than 1,500.

3. The optical fiber according to claim 1, wherein
   the polymer cladding contains perfluoropolyether having two (meth)acrylate functional groups with a molecular weight equal to or larger than 600 and less than 1,500.

4. The optical fiber according to claim 2, wherein
   the polymer cladding contains 5 to 30 wt % of the perfluoropolyether.

5. The optical fiber according to claim 1, wherein
   the polymer cladding contains 50 wt % or more of fluorine.

6. The optical fiber according to claim 1, wherein
   the polymer cladding has a viscosity of 1,000 to 50,000 mPa·s in an uncured state.

7. The optical fiber according to claim 1, wherein the optical fiber has a transmission loss of 1.0 dB/km or less for an input light intensity of 10 W or less.

8. An optical fiber, comprising:
   a core;
   a glass cladding which is provided at a periphery of the core and has a refractive index smaller than the core; and
   a polymer cladding which is provided at a periphery of the glass cladding and has a refractive index smaller than the glass cladding, wherein
   the polymer cladding includes perfluoropolyether having two (meth)acrylate functional groups, and
   the polymer cladding has a difference between an elasticity modulus at 60° C. and that at 23° C. equal to or smaller than 100 MPa, and also the polymer cladding has a Young' modulus equal to or larger than 200 MPa at 23° C.

9. The optical fiber according to claim 8, wherein
   the polymer cladding contains perfluoropolyether having two (meth)acrylate functional groups with a molecular weight less than 1,500.

10. The optical fiber according to claim 8, wherein
    the polymer cladding contains perfluoropolyether having two (meth)acrylate functional groups with a molecular weight equal to or larger than 600 and less than 1,500.

11. The optical fiber according to claim 8, wherein
    the polymer cladding contains 5 to 30 wt % of the perfluoropolyether.

12. The optical fiber according to claim 8, wherein
    the polymer cladding contains 50 wt % or more of fluorine.

13. The optical fiber according to claim 8, wherein
    the polymer cladding has a viscosity of 1,000 to 50,000 mPa·s in an uncured state.

14. The optical fiber according to claim 8, wherein
    the optical fiber has a transmission loss of 1.0 dB/km or less for an input light intensity of 10 W or less.

* * * * *